United States Patent Office 3,203,908
Patented Aug. 31, 1965

3,203,908
POLYMERIC ORGANOBORON COMPOUNDS
Kiyoshi Kitasaki, Garden Grove, and George W. Willcockson, Anaheim, Calif., assignors to United States Borax & Chemical Corporation, Los Angeles, Calif., a corporation of California
No Drawing. Filed Dec. 4, 1961, Ser. No. 156,943
4 Claims. (Cl. 260—2)

The present invention relates as indicated to a new class of organorboron compounds, diphenyldiboronic acid and the diphenyldiboronate esters.

The compounds of the present invention have a wide variety of industrial applications. They find utility as fuel additives, as stabilizers for lubricating oils and greases, and as epoxy resin curing agents. They are also used as ingredients in adhesive compositions and in the preparation of binders for fiberglass laminates. These compounds also find utility as fungicides, bacetriostatic agents, and as a herbicides.

Another important use of the present compounds is as a precursor for the preparation of thermally stable polymeric organoboron compounds. These compounds when caused to react with polyhydroxy or polyamino aromatic compounds will form polymers which exhibit a high degree of stability at temperatures of over 500° C. The polymeric compounds so produced can be molded or used as protective coatings for materials which are to be subjected to high temperature environments.

It is, therefore, the principal object of the present invention to provide as new compositions of matter diphenyldiboronic acid and diphenyldiboronate esters.

It is a further object of this invention to provide new polymeric organoboron compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises organoboron compounds having the formula

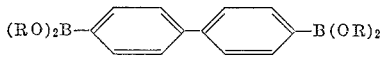

where R is selected from the group consisting of hydrogen, alkyl radicals of from 2 to 6 carbon atoms, and phenyl.

The preferred method for preparing the present compounds consists of combining a lower trialkyl borate with a Grignard reagent at low temperatures with constant agitation. The mixture is allowed to warm to about ambient temperature with agitation. The resultant Grignard-trialkyl borate complex is hydrolyzed with a mineral acid-water solution. Solvent is then removed by distillation at reduced pressure and filtration of the residual slurry yields diphenyldiboronic acid as the filter cake. The diphenyldiboronic acid can then be esterified to the desired tetraalkyl diphenyldiboronate where the alkyl radicals contain from 2 to 6 carbon atoms, and the tetraalkyl esters can be converted to the phenyl ester by transesterification, a well-known procedure.

The Grignard reagents applicable to the present invention have the formula

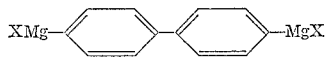

where X is either chlorine, bromine or iodine. They are prepared by the reaction of a 4,4'-dihalodiphenyl with magnesium turnings in the presence of an ethereal solvent such as tetrahydrofuran.

As stated previously the Grignard-trialkyl borate complex formed in the reaction is hydrolyzed in an aqueous mineral acid solution. Mineral acids, such as hydrochloric acid, phosphoric acid and sulfuric acid are suitable for this use.

The following examples are illustrative of the compounds, and method for preparing the compounds, of the present invention:

I. A solution of 48.3 grams (0.155 mole) of 4,4'-dibromodiphenyl in 300 ml. of tetrahydrofuran was added dropwise to 7.45 grams (0.31 gram-atom) of magnesium turnings after initiating the reaction with 1 ml. of ethyl bromide and a small amount of the 4,4'-dibromodiphenyl solution. The reaction mixture was heated under reflux with constant agitation for about 8 hours, and was then cooled to about −80° C. and 27 grams (0.26 mole) of trimethyl borate was added. Agitation was continued and the reaction mass was allowed to warm to room temperature. The reaction mass was diluted with a mixture of ether and tetrahydrofuran and was added to a cold aqueous hydrochloric acid solution. The resultant slurry was allowed to warm to about ambient temperature, and the tetrahydrofuran and ether were removed by distillation at reduced pressure. The residual slurry was then filtered and the insoluble reaction product, 4,4'-diphenyldiboronic acid, was recovered. Chemical analysis of the product yielded the following data.

Calculated for $C_{12}H_{12}B_2O_4$: B=8.95%. Found in product: B=8.83%.

II. Example I was repeated except that 4,4'-dichlorodiphenyl was used instead of 4,4'-dibromodiphenyl. The resultant product was identical to that of Example I.

III. Example I was repeated except that 4,4-diiododiphenyl was used instead of 4,4'-dibromodiphenyl. The resultant product was identical to that of Example I.

IV. 4,4'-diphenyldiboronic acid, 48.37 grams (0.20 mole) was dissolved in 80 grams (1.74 moles) of ethanol and 200 ml. of benzene. The solution was heated to reflux and the water produced in the reaction was removed as a water-benzene-ethanol-azeotrope. The excess ethanol and benzene were removed at reduced pressure, and fractional distillation of the residue yielded 4,4'-bis(diethoxyboryl)diphenyl. Chemical analysis of the product yielded the following data.

Calculated for $C_{20}H_{28}B_2O_4$: B=6.11%. Found in product: B=6.03%.

V. 4,4'-diphenyldiboronic acid, 60.47 grams (0.25 mole) was dissolved in 150 grams (2.50 moles) of isopropanol and 200 ml. of toluene. The solution was heated to reflux and the water produced in the reaction was removed as a water-toluene-isopropanol azetrope. The excess isopropanol and toluene were removed at reduced pressure, and fractional distillation of the residue yielded 4,4'-bis(diisopropoxyboryl)diphenyl. Chemical analysis of the product yielded the following data.

Calculated for $C_{24}H_{36}B_2O_4$: B=5.28%. Found in product: B=5.11%.

VI. 4,4'-diphenyldiboronic acid, 48.37 grams (0.20 mole), was dissolved in 72 grams (0.97 mole) of n-butanol and 100 ml. of toluene. The solution was heated to reflux and the water produced in the reaction was removed as a water-toluene azeotrope. The excess butanol and toluene were removed at reduced pressure and fractional distillation of the residue yielded 4,4'-bis(di-n-butoxyboryl)diphenyl. Chemical analysis of the product yielded the following data.

Calculated for $C_{28}H_{44}B_2O_4$: B=4.64%. Found in product: B=4.57%.

VII. 4,4'-bis(di-n-butoxyboryl)diphenyl, 44.63 grams (0.10 mole), was added to a solution of 37.64 grams (0.40 mole) of phenol in 200 ml. of xylene. The solution was heated under reflux and the butanol produced was removed as a butanol-xylene azeotrope. Excess xylene was then removed and the residue yielded 4,4'-bis(diphenoxyboryl)diphenyl. Chemical analysis of the product yielded the following data.

Calculated for $C_{36}H_{28}B_2O_4$: B=3.96%. Found in product: B=3.81%.

As stated previously, the present 4,4'-diphenyldiboronate esters are important precursors for the preparation of new thermally stable polymeric organboron compounds. Thus, when a 4,4'-diphenyldiboronate ester is heated with either 3,3',4,4' - tetraaminodiphenyl, or 3,3',4,4' - tetrahydroxydiphenyl, or 3,3' - dihydroxy - 4,4' - diaminodiphenyl, we obtain a thermally stable polymeric organboron compound having the recurring structural unit

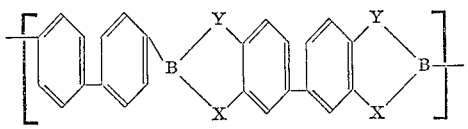

where X and Y are either oxygen or imino (NH) and they can be the same or different depending on which of the above reactants are used.

The following examples are given to illustrate the polymeric organoboron compounds of the present invention:

VIII. A solution of 1.45 grams (0.0031 mole) of 4,4'-bis(di-n-butoxyboryl)diphenyl in 50 ml. of chlorobenzene was added to a slurry of 0.672 gram (0.0031 mole) of 3,3'-dihydroxy-4,4'-diaminodiphenyl in 50 ml. of chlorobenzene. The reaction mixture was stirred and heated at reflux for a period of about 7.5 hours, at which time the theoretical amount, 0.92 gram, of butanol had been removed. The insoluble reaction product was then recovered from the residual slurry by filtration, and was dried in vacuum at about 100° C. for 2 hours. The dry product, when placed in a sealed tube and heated to temperatures up to about 510° C. began to discolor, but did not melt. Chemical analysis of the product yielded the following data.

Calculated for $C_{24}H_{16}B_2N_2O_2$: B=5.61%. Found in product: B=5.2%.

IX. A solution of 7.08 grams (0.02 mole) of 4,4'-bis(diethoxyboryl)diphenyl in 75 ml. of xylene was added to a slurry of 4.29 grams (0.02 mole) of 3,3',4,4'-tetraaminodiphenyl in 75 ml. of xylene. The reaction mixture was stirred and heated at reflux for a period of about 9 hours, at which time the theoretical amount of ethanol, 36.83 grams, had been removed. The insoluble reaction product was then recovered from the residual slurry by filtration, and was dried in vacuum at about 150° C. for 2 hours. The dry product, when placed in a sealed tube and heated to temperatures up to about 535° C. showed no visible change in appearance. Chemical analysis of the product yielded the following data.

Calculated for $C_{24}H_{18}B_2N_4$: B=5.6%. Found in product: B=5.42%.

X. A solution of 4.10 grams (0.01 mole) of 4,4'-bis(diisopropoxyboryl)diphenyl in 75 ml. of xylene was added to a slurry of 2.18 grams (0.01 mole) of 3,3',4,4'-tetrahydroxydiphenyl in 75 ml. of xylene. The reaction mixture was stirred and heated at reflux for a period of about 8 hours, at which time the theoretical amount of isopropanol, 24.04 grams, had been removed. The insoluble reaction product was then recovered from the residual slurry by filtration, and was dried in vacuum at about 150° C. for 2 hours. The dry product, when placed in a sealed tube and heated to temperatures up to about 535° C. showed no visible change in appearance. Chemical analysis of the product yielded the following data.

Calculated for $C_{24}H_{14}B_2O_4$: B=5.58%. Found in product: B=5.37%.

Other modes of applying the principle of the invention may be employed, change being made as regards the details described, provided the features as stated in any of the following claims or the equivalent of such be employed.

We, therefore, particularly point out and distinctly claim as our invention:

1. Polymeric organoboron compounds of the recurring structural unit

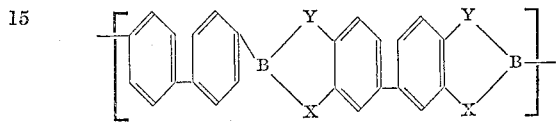

where X and Y are selected from the group consisting of oxygen and imino (NH), said units being bonded together through boron-carbon bonds of which the carbon atom is a nuclear carbon of a biphenyl group.

2. A polymeric organoboron compound of the recurring structural unit

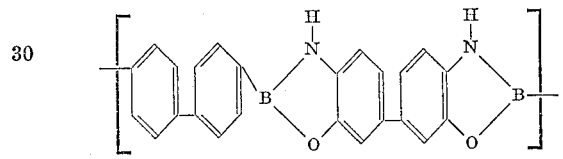

said units being bonded together through boron-carbon bonds of which the carbon atom is a nuclear carbon of a biphenyl group.

3. A polymeric organoboron compound of the recurring structural unit

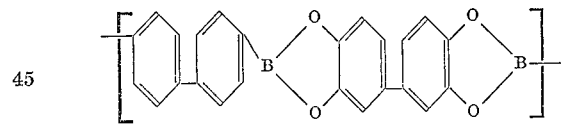

said units being bonded together through boron-carbon bonds of which the carbon atom is a nuclear carbon of a biphenyl group.

4. A polymeric organoboron compound of the recurring structural unit

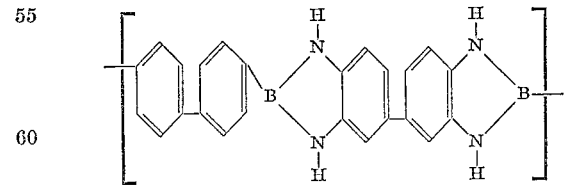

said units being bonded together through boron-carbon bonds of which the carbon atom is a nuclear carbon of a biphenyl group.

References Cited by the Examiner

UNITED STATES PATENTS

| | | | |
|---|---|---|---|
| 2,948,751 | 8/60 | Brotherton | 260—606.5 |
| 3,090,801 | 5/63 | Washburn et al. | 260—462 |
| 3,092,652 | 6/63 | Stern et al. | 260—462 |

(Other references on following page)

OTHER REFERENCES

Nielsen et al.: "Jour. Am. Chem. Soc.," vol. 79, June 20, 1957, pages 3081–4.

Letsinger et al.: "Jour. Am. Chem. Soc.," vol. 81, June 20, 1959, pages 3013–7.

Bamford et al.: "S.C.I. Monograph No. 13," 1960, pages 320–327.

Soloway: "Jour. Am. Chem. Soc.," vol. 82, May 20, 1960, pages 2442–4.

Ruigh et al.: "Research on Boron Polymers," WADC Technical Report 55–26, part 2, pp. 59–61, May 1955, released by Armed Services Technical Information Agency, Arlington Hall Station, Arlington 12, Va.

Marvel et al.: "High Polymeric Materials," WADC Technical Report 61–12, pp. 103–104, April 1961, released by Armed Services Technical Information Agency, Arlington Hall Station, Arlington 12, Va.

MURRAY TILLMAN, *Primary Examiner.*

LOUISE P. QUAST, SAMUEL H. BLECH, *Examiners.*